United States Patent [19]

Farafontov et al.

[11] 4,085,196

[45] Apr. 18, 1978

[54] PROCESS FOR PRODUCING SYNTHETIC DIAMONDS

[76] Inventors: Vladimir Ivanovich Farafontov, Dibuny, ulitsa Kljucheva, 69, kv. 4, Leningrad; Yaroslav Alexeevich Kalashnikov, Starokonjushenny pereulok, 39, kv. 5, Moscow; Jury Nikolaevich Novikov, ulitsa Petra Romanova, 15, kv. 19, Moscow; Mark Efimovich Volpin, ultisa Vavilova, 48, kv. 412, Moscow; Leonid Fedorovich Vereschagin, Kutuzovsky prospekt, 2/1, kv. 231, Moscow; Vladislav Sergeevich Lysanov, prospekt Vavilova, 8, korpus 1, kv. 422, Leningrad, all of U.S.S.R.

[21] Appl. No.: 772,474

[22] Filed: Feb. 28, 1977

[30] Foreign Application Priority Data

Mar. 1, 1976 U.S.S.R. ............................ 2323002(I)

[51] Int. Cl.$^2$ ............................................ C01B 31/06
[52] U.S. Cl. .................................................... 423/446
[58] Field of Search ........................................ 423/446

[56] References Cited

U.S. PATENT DOCUMENTS

| | | | |
|---|---|---|---|
| 2,947,610 | 8/1960 | Hall et al. | 423/446 |
| 2,992,900 | 7/1961 | Bovenkerk | 423/446 |
| 3,268,457 | 8/1966 | Giardini et al. | 423/446 X |
| 3,334,968 | 8/1967 | Ishizuka | 423/446 |
| 3,743,703 | 7/1973 | Prikhna et al. | 423/446 |

*Primary Examiner*—Edward J. Meros
*Attorney, Agent, or Firm*—Steinberg & Blake

[57] ABSTRACT

A process for producing synthetic diamonds which comprises the synthesis of diamonds from a charge consisting of graphite or a carbonaceous material capable of being graphitized and a catalyst; as the latter use is made of a metalgraphite laminar compound of a transition metal, wherein said metal is interposed between the graphite layers and chemically bonded therewith.

Said catalyst makes it possible to shorten the duration of the synthesis down to several seconds and carry-out the synthesis at a temperature of below 1,200° C. The resulting diamond crystals are colorless and transparent.

11 Claims, No Drawings

PROCESS FOR PRODUCING SYNTHETIC DIAMONDS

The present invention relates to processes for producing synthetic diamonds. Synthetic diamonds can be produced both in the form of powders and large aggregates.

Powders of synthetic diamonds are employed as grinding powders as well as for the preparation of various pastes, abrasive and grinding wheels.

Larger diamonds are employed for the manufacture of cutters, saws, boring bits and chisels, dies, smoothing plates and instruments of active control.

Known in the art are processes, wherein synthetic diamonds are produced under high pressures of from 45 to 90 kbar and at temperatures of from 1,200° to 2,000° C from a charge consisting of graphite and a catalyst. As the catalyst use is made of metals pertaining to the groups of iron and platinum as well as chromium, manganese, tantalum which are employed either per se or as alloys. Furthermore, as the catalyst use is made of compounds of said metals which under the synthesis conditions are decomposed to free metals and the latter serve as catalytically acting agents.

The catalysts are employed either in the form of powders uniformly intermixed with graphite or in the form of larger aggregates having, in certain cases, a particular shape (i.e. disc, rod, and the like).

One of the closest analogues of the present invention constitutes a process for producing synthetic diamonds comprising the use of pressures exceeding 75 kbr and temperatures of above 1,200° C for the treatment of a carbonaceous material, including graphite, in the presence of a catalyst which is a metal such as iron, cobalt, nickel, rhodium, ruthenium, palladium, osmium, iridium, chromium, tantalum and manganese.

As the catalyst, said metal can be used in the form of an ionic compound decomposing to a free metal at a temperature within the range of from 1,200° to 2,000° C. The synthesis temperatures exceed 1,200° C and duration of the process is varied from 2 to 20 minutes so that at the temperature of 1,200° C, this duration is equal to 20 minutes, whereas at a temperature of from 1,620° to 1,700° C it is equal to 2 minutes and less.

Said temperatures approach the melting points of the above-mentioned metals and are inexpedient in the synthesis of diamonds. However, at such temperatures there occurs a substantial heating of metal parts of high-pressure chambers. This reduces the service life of the chambers made of rather expensive alloyed steels and hard metal-ceramic alloys.

Catalytic metals and alloys thereof adapted for initiation of the transition of graphite to diamond should be preferably converted into a dispersed form or become molten and form, with a carbon source, an active "metal-carbon" system. These processes feature high durations which does not make it possible under the conditions of high static pressures, to obtain diamonds during short periods of time at temperatures below 1,200° C.

The present invention is directed to the provision of such a catalyst for the synthesis of diamonds which would make it possible to intensify the production process.

This object is accomplished by a process for producing synthetic diamonds which comprises the synthesis of diamonds from a charge consisting of graphite or a carbonaceous material capable of being graphitized and a catalyst comprising a compound of at least one transition metal with graphite, wherein said metal is interposed between carbon layers of graphite and chemically bonded therewith.

The catalyst according to the present invention makes it possible to shorten the synthesis duration and to effect it within a period of from 1 to 10 sec at a temperature of 1,200° C and below and to improve the diamonds' quality. The diamonds produced according to the process of the present invention are colourless and transparent.

In accordance with the present invention, the amount of said catalyst in the charge is varied within the range of from 10 to 80% by weight. The catalyst content below or above said range results in a sharp decrease in the diamond yield.

In accordance with the present invention, the metal amount in the metal-graphite compound is selected within the range of from 1 to 25% by weight. Said limits are caused by the synthesis of the above-mentioned compounds.

In accordance with the present invention, as the catalyst use is made of a metal-graphite compound containing at least one of the following metals: iron, cobalt, nickel, manganese, chromium, niobium, tantalum and metals of platinum group. However, it is desirable to use, as the catalyst, a metal-graphite compound possessing a higher catalytic activity and containing available and inexpensive metals such as iron, cobalt, nickel, manganese, chromium.

As the catalyst it is advisable that use be made of the following metal-graphite compounds: iron-graphite compound containing 15% by weight of iron, a cobalt-graphite compound containing 25% by weight of cobalt, and a metal-graphite compound containing 8% by weight of iron, 6% by weight of manganese, 4% by weight of nickel, since they are readily available and easily prepared.

It is also possible to employ as a catalyst mixtures of said metal-graphite compounds for example a mixture consisting of an iron-graphite compound containing 12% by weight of iron, and a metal-graphite compound containing 8% by weight of manganese, 4% by weight of nickel, and 3% by weight of cobalt; also possible are other combinations of said metalgraphite compounds.

Owing to said catalyst, the synthesis of diamond can be performed at a temperature within the range of from 850° to 1,200° C for a period of from 1 to 10 sec. Carrying-out the synthesis at lowered temperatures, as compared to the prior art processes, is economically more efficient. The process according to the present invention makes it possible to produce colourless and transparent diamonds.

Metal-graphite compounds of transition metals comprise known compounds, i.e. chemical compounds of said metals with carbon, wherein atoms of the latter form two-dimensional aromatic condensed systems, wherebetween there are atoms of metals thus forming alternating layers of metal and carbon.

These laminar compounds are prepared by reducing laminar compounds of chlorides of transition metals with graphite by different methods, e.g. by means of hydrogen, sodium boron hydride in an alkaline solution; lithium alumohydride in tetrahydrofuran; sodium in liquid ammonia; and aromatic anion-radicals in tetrahydrofuran.

The resulting metal-graphite compounds comprise substances, wherein d-electrons of atoms of a transition metal form a chemical bond with carbon atoms; the arrangement of the latter is similar to the arrangement of carbon atoms in the graphite layers but differs therefrom by the value of distance between said graphite layers.

Special structure of this type compounds is justified by X-ray studies, investigations of magnetic properties and the data of Mössbauer spectroscopy.

Transition metals might both fill each void between the carbon layers in the structure of graphite and leave some voids unfilled, depending on the synthesis procedure.

Metal-graphite laminar compounds can contain either one among selected metals or several of them, depending on the synthesis procedure.

Metal-graphite laminar compounds of transition metals are stable at room temperature; for certain metals this stability is retained under elevated pressures and temperatures, i.e. under the conditions of the synthesis of diamonds they retain their chemical specificity and do not transform into other compounds of metals with carbon, such as carbides; neither do they decompose to a free metal and carbon, nor form a solution of a metal in carbon.

Due to this stability under high temperatures and pressures, said metal-graphite compounds do not transform into diamond, though they contain atoms of carbon and a metal. However, being added to graphite, they promote its conversion to diamond, i.e. they comprise catalysts for the synthesis of diamond.

Metal-graphite laminar compounds feature a very high mobility under a high pressure and at an elevated temperature. This facilitates their penetration, as catalysts, at a very high rate into the mass of graphite thus ensuring very high rates of the diamond formation during periods measured in seconds.

Metal-graphite laminar compounds possess a high activity at much lower temperatures as compared to the prior art catalysts for the synthesis of diamond, i.e. within the range of from 850° to 1,200° C. As a consequence, the formation of diamonds in the presence of these compounds does not necessitate as high temperatures as are required in the prior art processes which use, as the catalysts, free metals.

Diamonds produced with the use of said metal-graphite laminar compounds as catalysts, differ from conventionally produced diamonds in that they are perfect colourless and transparent. This is probably associated with a small amount of impurities in the diamonds produced by the process according to the present invention.

For a better understanding of the present invention, given hereinbelow are specific examples illustrating the process performed using conventional equipment employed in the art.

Examples 1 through 7 illustrate the synthesis of diamonds in accordance with the present invention. Example 8 illustrates the preparation of a metal-graphite compound. Example 9 illustrates the production of diamond by a conventional process.

EXAMPLE 1

A charge is prepared containing 70% by weight of graphite and 30% by weight of an iron-graphite compound. The content of iron in the iron-graphite compound is 15% by weight. The charge is subjected to the pressure of 70 kbar and temperature of 850° C for 3 sec. The final product contains 40% of diamonds by weight of the employed graphite.

EXAMPLE 2

A charge is prepared containing 20% by weight of a coke featuring a good ability of being graphitized and 80% by weight of a nickel-graphite compound containing 18% by weight of nickel. The charge is subjected to the pressure of 80 kbar and temperature of 1,000° C for 10 sec. The final product contains 35% of diamonds calculated with respect to the weight of the coke employed.

EXAMPLE 3

A charge is prepared containing 80% by weight of graphite and 20% by weight of a cobalt-graphite compound containing cobalt in the amount of 25% by weight.

The charge is treated under the pressure of 75 kbar and at the temperature of 950° C for 5 sec. The final product contains 35% of diamonds calculated with respect to the weight of the graphite employed.

EXAMPLE 4

Prepared is a charge containing 70% by weight of graphite and 30% of a metal-graphite compound containing 8% by weight of iron, 6% by weight of manganese, and 4% by weight of nickel. The charge is then treated under the pressure of 65 kbar, and at the temperature of 1,000° C for 5 sec. The final product contains diamonds in the amount of 40% by weight of the graphite employed.

EXAMPLE 5

A charge is prepared containing 65% by weight of graphite and 35% by weight of a chromium-graphite compound containing chromium in the amount of 10% by weight. The mixture is subjected to the action of pressure equal to 90 kbar and temperature of 1,150° C for 5 sec. The final product contains diamonds in the amount of 35% by weight of the graphite employed.

EXAMPLE 6

A charge is prepared containing 60% by weight of graphite, 20% of nickel-graphite and 20% of a manganese compound. The nickel-graphite compound contains 12% by weight of nickel and the manganese-graphite compound — 15% by weight of manganese. The mixture is subjected to the action of pressure of 60 kbar at the temperature of 900° C for 10 sec. The final product contains diamonds in the amount of 45% by weight of the graphite employed.

EXAMPLE 7

A charge is prepared containing 60% by weight of graphite, 20% by weight of an iron-graphite compound containing 12% by weight of iron, and 20% by weight of a metal-graphite compound containing 8% by weight of manganese, 4% by weight of nickel and 3% by weight of cobalt. The charge is then subjected to the treatment under the pressure of 70 kbar at the temperature of 1,050° C for 2 sec. The final product contains diamonds in the amount of 35% by weight of the graphite employed.

EXAMPLE 8

This Example illustrates the preparation of a laminar metal-graphite compound.

4 g of NaBH$_4$ are dissolved in 200 ml of an aqueous or alcoholic solution of KOH and mixed with 1.5 g of a laminar graphite compound of iron chloride upon agitation in a current of argon. The reaction mixture is stirred at room temperature for 4 hours. The resulting solid product is washed with a 10% hydrochloric acid, water, acetone, ether and dried at the temperature of 120° C for 10 hours.

The subsequent tests have shown that there is obtained a mixture of two graphite compounds of iron with carbon; in the former atoms of iron and carbon form uniformly alternating layers, whereas in the latter the number of layers of iron atoms is one-half the number of layers of carbon atoms.

Said iron-graphite laminar compound is subjected to the temperature of 1,600° C under the pressure of 70 kbar for 5 minutes. The subsequent tests have shown that after this treatment the product is fully identical with the starting compound and no changes in its structure are observed.

EXAMPLE 9

This Example illustrates the production of diamond by one of the prior art process and is given by way of illustration.

A charge containing 70% by weight of graphite and 30% by weight of metallic iron is treated under the pressure of 70 kbar at the temperature of 1,700° C for 30 sec. The resulting product contains 35% of diamonds as calculated for the weight of the graphite employed. At a temperature below 1,300° C all the attempts to produce diamonds by this prior art process have failed.

What is claimed is:

1. A process for producing synthetic diamonds which comprises subjecting a charge consisting of graphite or a carbonaceous material capable of being graphitized and a catalyst consisting of at least one laminar compound of at least one transition metal with graphite in which said metal in said laminar compound is interposed between the carbon layers of the graphite and chemically bonded therewith to a pressure and temperature and for a time sufficient to convert the non-chemically bonded graphite of said charge to diamond, said laminar compound remaining stable at said pressure and temperature, whereby rapid conversion is effected.

2. A process as claimed in claim 1, wherein the content of said catalyst in the charge is from 10 to 80% by weight.

3. A process as claimed in claim 1, wherein the amount of said metal in said metal-graphite laminar compound is from 1 to 25% by weight.

4. A process as claimed in claim 1, wherein as the catalyst use is made of a metal-graphite laminar compound containing at least one of the following metals: iron, cobalt, nickel, manganese and chromium.

5. A process as claimed in claim 1, wherein as the catalyst use is made of a laminar compound of graphite and iron containing iron in the amount of 15% by weight.

6. A process as claimed in claim 1, wherein as the catalyst use is made of a laminar compound of graphite and cobalt containing cobalt in the amount of 25% by weight.

7. A process as claimed in claim 1, wherein as the catalyst use is made of a laminar compound of graphite with iron, manganese and nickel containing 4% by weight of iron, 6% by weight of manganese and 4% by weight of nickel.

8. A process as claimed in claim 1, wherein as the catalyst use is made of a mixture of two and more of said metal-graphite laminar compounds.

9. A process as claimed in claim 8, wherein as the catalyst use is made of a mixture consisting of a metal-graphite laminar compound containing 12% by weight of iron and a metal-graphite laminar compound containing 8% by weight of manganese, 4% by weight of nickel and 3% by weight of cobalt.

10. A process as claimed in claim 1, wherein the synthesis of diamonds is effected at a temperature ranging from 850° to 1,200° C under a pressure of from 60 to 80 kbar.

11. A process as claimed in claim 10 wherein said charge is subjected to the conditions for a time of 1–10 seconds.

* * * * *